United States Patent [19]

Murata et al.

[11] 4,344,696
[45] Aug. 17, 1982

[54] MEANS FOR DRIVING RECIPROCATING MEMBERS

[75] Inventors: Tomoji Murata; Yasuo Goto, both of Toyokawa; Masamichi Hayashi, Aichi, all of Japan

[73] Assignee: Minolta Camera Kabushiki Kaisha, Osaka, Japan

[21] Appl. No.: 176,636

[22] Filed: Aug. 8, 1980

[30] Foreign Application Priority Data

Aug. 10, 1979 [JP] Japan .............................. 54-102468

[51] Int. Cl.³ ...................... G03G 15/28; G03G 15/32
[52] U.S. Cl. .......................................... 355/8; 355/84
[58] Field of Search .............. 355/8, 81, 84; 350/6.1, 350/6.5

[56] References Cited

U.S. PATENT DOCUMENTS

| | | | |
|---|---|---|---|
| 3,677,633 | 7/1972 | Huber | 355/8 X |
| 3,850,520 | 11/1974 | Washio et al. | 355/8 X |
| 4,148,578 | 4/1979 | Bujese | 355/8 |
| 4,192,608 | 3/1980 | Goshima et al. | 355/8 X |
| 4,248,523 | 2/1981 | Doi et al. | 355/8 X |
| 4,256,399 | 3/1981 | Ikeda | 355/8 |

FOREIGN PATENT DOCUMENTS 52-55255 10/1975 Japan .
54-82636 11/1977 Japan .

*Primary Examiner*—J. V. Truhe
*Assistant Examiner*—Keith E. George
*Attorney, Agent, or Firm*—Wenderoth, Lind & Ponack

[57] ABSTRACT

There is provided an arrangement for driving reciprocating members, which is for use in the optical system of an electrophotographic copying machine of the scanning exposure type. The optical system is actuated to have an initial velocity through the resilient force caused by each of spring members subsequent to alternate arrivals to respective end positions of scanning and returning movements. After having obtained the predetermined velocity either for the scanning, or the return operation, the optical system is actuated to be electrically driven for the purpose through the actuation of a clutch.

8 Claims, 8 Drawing Figures

MEANS FOR DRIVING RECIPROCATING MEMBERS

BACKGROUND OF THE INVENTION

This invention relates to means for driving reciprocating members, and more particularly, to the above described means, which is adapted to be for use in an electrophotographic copying machine of the scanning exposure type (i.e. a copying machine of the optical system transfer type and a copying machine of the manuscript platform transfer type).

According to the conventional arrangements, reversal of the drive of a movable member from a forward direction to the reverse, and vice versa, is effected by actuating a clutching means at an instance when the velocity of the forward, or the reverse movement of the movable member becomes zero. However, according to such actuating mode of the clutching means as described above, the movable member is gradually accelerated from a velocity of zero and then, attains a steady, optimum velocity of V for exposure after travelling a distance of Q, the situation of which is specifically shown in FIG. 1. Such being the case, since the movable member must travel an extra distance prior to the operation thereof, the resultant machine requires a relatively long copying time, accordingly. In addition, the resultant machine itself can not help being bulky in size. From the standpoint of the constructional arrangement, since the movable member must be accelerated from the velocity of zero, an initial torque and associated loads exerted on driving system including the clutching means must become large. Therefore, when the durability of the driving system is taken into consideration, the driving system further becomes bulky in size, with an accompanying high manufacturing cost.

To overcome such deficiencies as described above, the introduction of driving means having a high driving rating may be considered. However, this also results in the bulky size of the machine, with an accompanying high manufacturing cost thereof. Moreover, if such driving means as described above is introduced, an excessively rapid increase of the initial velocity as shown in a dot and line curve (b) in FIG. 1 causes unsteady vibration to take place in the copying machine. Furthermore, the increase of the initial velocity may not always bring the velocity to the predetermined level in an effective manner owing to the overshoot of the velocity as shown in FIG. 1. Thus, the conventional arrangements and such improvements as described in the foregoing can hardly solve the deficiencies as described earlier.

Recently, in view of the conventional deficiencies as described earlier, there have been proposed several improvements with respect to the means for controlling the movable member of the copying machine, which reciprocates in the forward and reverse directions to scan an original in cooperation with a resilient member e.g. a spring member. Namely, according to these proposals, the conversion of the reciprocating movement from the forward to the reverse is arranged to be smoothly executed through the resiliency of the spring member, which is located at one end of either the forward, or the reverse movement.

More specifically, according to a manuscript platform transfer controlling apparatus, which is disclosed in Japanese Laid Open Utility Model Application 52-55255, the manuscript platform is provided with a guide rod and a coil spring member coupled to the guide rod, while a stop is provided for the frame of the copying machine at a position where the scanning movement of the manuscript platform is executed, so that the guide rod and the coil spring member are resiliently engageable at the end of the scanning operation. The scanning movement of the manuscript platform is resiliently prevented from the further movement through the compression of the coil member at the end position and then the manuscript platform is adapted to begin the reverse movement through the resilient force prior to the actuation of the clutch for the reverse movement. Similarly, according to an arrangement disclosed in Japanese Laid Open Utility Model Application 54-82636, there is also provided a buffer stopping means. The buffer stopping means comprises a resilient member, being positioned at a position of the reversal of movement of the reciprocating member and being compressible at the position, and a clutch arrangement capable of changing over the direction of the reciprocation in cooperation with the resilient member, wherein respective actuations of the cessation of the forward movement and the start of the reverse movement are arranged to be executed, after the resilient member has been compressed. In spite of the improvements in the prior art as described above, these arrangements can only buffer the momentum associated with the reciprocation and still have the following deficiencies. Namely, since the spring member per se is provided either for the scanning member or at the end of the scanning movement, the consequent arrangement can not help being complicated. In addition, as for the most undesirable point, the movable member must perform a full scanning step, even if the lengthwise size of the original is smaller than the distance of the full scanning movement. This is due to the fact that in either of the arrangements, since the spring member of the stop is selectively provided at the position where the full scanning movement ends, the movable member must travel the full scanning movement, irrespective of the size of the original. Accordingly, as long as these arrangements are employed for the purpose as described earlier, rapid, continuous electrophotographic reproductions can not be made. On the other hand, according to a copying apparatus disclosed in U.S. Pat. No. 4,192,608, in order to execute the change of movement to return the movable member to the position of the start of the scanning movement, the apparatus takes advantage of the resilient character of a spring member. However, according to the known apparatus as described above, the spring member must be provided at approximately the end position of the return movement of the manuscript tray. In addition, the apparatus described above further requires movement restriction means so as to permit the spring member to be maintained in a compressed condition, even if a successive reproduction is not intended to be carried out. Thus, according to the arrangement, the apparatus of the arrangement consequently becomes complicated.

SUMMARY OF THE INVENTION

Accordingly, an essential object of the present invention is to provide means for driving reciprocating members, which is for use in the optical system of an electrophotographic copying machine of the scanning exposure type.

Another important object of the present invention is to provide means for driving reciprocating members of the above described type, which can overcome all the disadvantages of the prior art devices specifically described in the foregoing.

A further object of the present invention is to provide means for driving reciprocating members of the above described type, which has a specifically novel construction and is highly efficient in use.

A still further object of the present invention is to provide means for driving reciprocating members of the above described type, which is compact in size and can be manufactured at low cost.

In accomplishing these and other objects according to one preferred embodiment of the present invention, there is provided means for driving reciprocating members, which is for use in alternate drives for forward and return movements of an optical system of an electrophotographic copying machine of the light exposure type. According to the embodiment described above, the optical system is given a predetermined initial velocity through the resilient force of each of several spring members subsequent to the arrivals at respective end positions of scanning and returning movements. After having obtained the predetermined velocity either for the scanning or the return operation, the optical system is actuated so as to be electrically driven through the actuation of a clutch. In another preferred embodiment of the present embodiment resilient means including the spring member is provided only for causing the optical system to have the predetermined initial velocity for the return movement subsequent to the arrival at the end position of scanning. More specifically, the means for driving reciprocating members comprises: clutching means to selectively transmit and interrupt alternate drives, thereby to cause the optical system to be electrically driven for forward and reverse movements, which includes a return clutch mounted on a first shaft for the return movement and a second clutch mounted on a second shaft for the scanning movement; a return gear mounted on the first shaft and a scan gear mounted on the second shaft, both being meshed with each other; resilient means for causing the optical system to have the predetermined initial velocity for the return movement subsequent to an arrival at the end position of scanning through the resilient energy stored thereby, which is substantially mounted on the second shaft so that it can function in association with the rotation of the second shaft; and electric circuit means for sequentially controlling the forward and reverse movements of the optical system, which comprises a limit switch disposed on the path of the movements of the optical system so that it can be actuated; a plurality of relay members; a plurality of switching contacts functioning in association with each of the relay members; a plurality of timers including first and second timers, with the first timer being turned ON in accordance with an actuation of the limit switch during the scanning movement, while the second timer is turned ON at the end of a timing operation of the first timer; a solenoid member including a member capable of seizing the resilient means when energized and being energized at the end of a timing operation of the first timer; the scan clutch being turned OFF, at the end of a timing operation of the second timer.

By the arrangement as described above, the resilient means can store the resilient energy prior to the end of the scanning movement, and the resilient energy can afterwards be transmitted to the return gear to cause the return movement to be effected therethrough. Consequently, it is possible to make the optical system have the rapid rising rate for the steady operating velocity with the result of rapid movement of the optical system. In addition, actuation for the return movement of the optical system can be made to correspond to the length of the original.

BRIEF DESCRIPTION OF THE DRAWINGS

These and other objects and features of the present invention will become apparent from the following description of a preferred embodiment thereof taken in conjunction with the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 2:
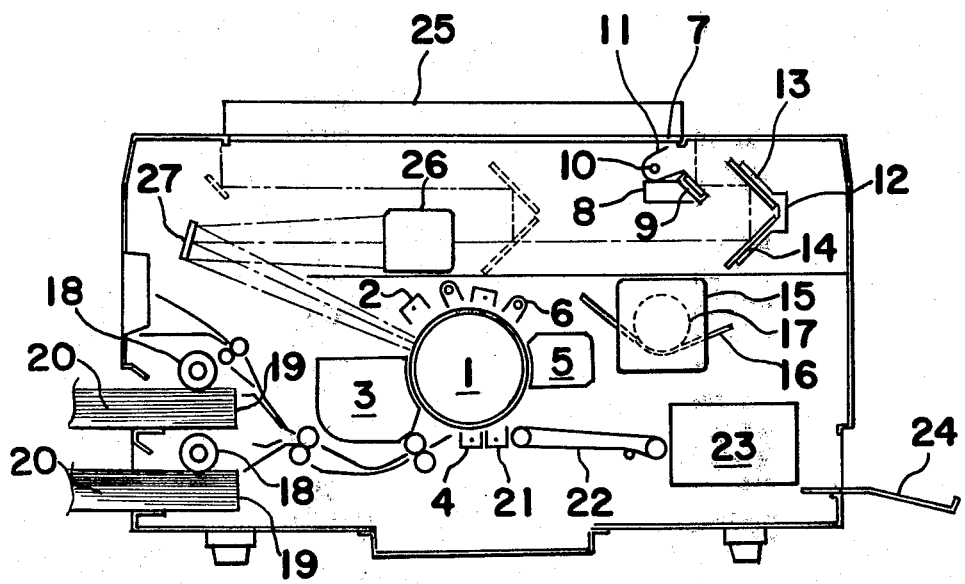
FIG. 2 is a schematic, longitudinal cross-section of an electrophotographic copying machine of the scanning exposure type with means for driving reciprocating members (an optical system) according to the present invention.

Referring now to FIG. 2, there is shown an electrophotographic copying machine of the scanning exposure type and incorporating the present invention.

The copying machine includes a corona charger 2, a developer unit 3, a transfer corona charger 4, a cleaner 5, and a charge eraser 6, each of which is disposed along a path of the photoreceptor surface of a photoreceptor drum 1 and all of which are well known as to the construction and arrangement thereof and, therefore, the details thereof are herein omitted for the sake of brevity. The copying machine further includes a transparent glass plate 7 for the support of an original (not shown here), a flexible or rigid cover 25 for covering the original from above and an illuminating unit including an illuminating lamp 10 which is connected to a light control means constituted by an electric power control circuit (not shown). The illuminating unit further includes a reflective shade 11 so designed as to reflect the rays of light emitted from the lamp 10 towards the transparent support glass plate 7 to illuminate the original placed on the transparent support glass plate 7. This illuminating unit is to be moved together with a first reflective mirror 9 and the reflective shade 11 which are both integrally connected to a first holder 8 as the illuminating unit moves, towards the left in FIG. 2, at a predetermined velocity V along guide rails (not shown here) by a driving mechanism described below, to illuminate the original on the transparent support glass 7 while scanning such original. A second reflective mirror 13 and a third reflective mirror 14, both of which are coupled to a second holder 12, are also moved towards the left in FIG. 2 at a predetermined velocity V/2 along the guide rails. Rays of light reflected from the original and carrying an image of the original are transmitted to a projecting lens assembly 26 and then projected by a fixedly disposed fourth mirror 27 onto a photoconductive surface of the photoreceptor drum 1 being rotated in one direction at a peripheral velocity equal to the velocity V of movement of illuminating unit so that an electrostatic latent image having a configuration corresponding to the original image so projected can be formed on the photoconductive surface of the photoreceptor drum 1 as is well known to those skilled in the art. During the continued rotation of the photoreceptor drum 1, the electrostatic latent image on the photoconductive surface is brought to the developing station where a powdery material is dispensed by the developer unit 3 onto the photoconductive surface to develop a toner image. This toner image on the photoconductive surface of the photoreceptor drum 1 is subsequently brought to a transfer station including the transfer corona charger 4 where the toner image is transferred onto a sheet of final support material, for example, a sheet of copying paper 20 fed from either one of paper supply units 19 by a paper feeding roller 18, the sheet of the final support material with the toner image so transferred being passed through an A.C. charger 21 to a fixing station 23 where heat is applied thereto to fix the toner image and then being ejected onto a tray 24. The transporation of the sheet of the final support material with the toner image to the fixing station is executed with an endless belt 22. When the forward, scanning movement is executed, an optical system including the first holder 8 and the second holder 12 are returned to the original position thereof.

The driving mechanism of the optical system includes a drive motor 15, a belt 16 and a drive transmission pulley 17. The energization of the drive motor 15 is arranged to be performed in a known manner.

Figure 3:
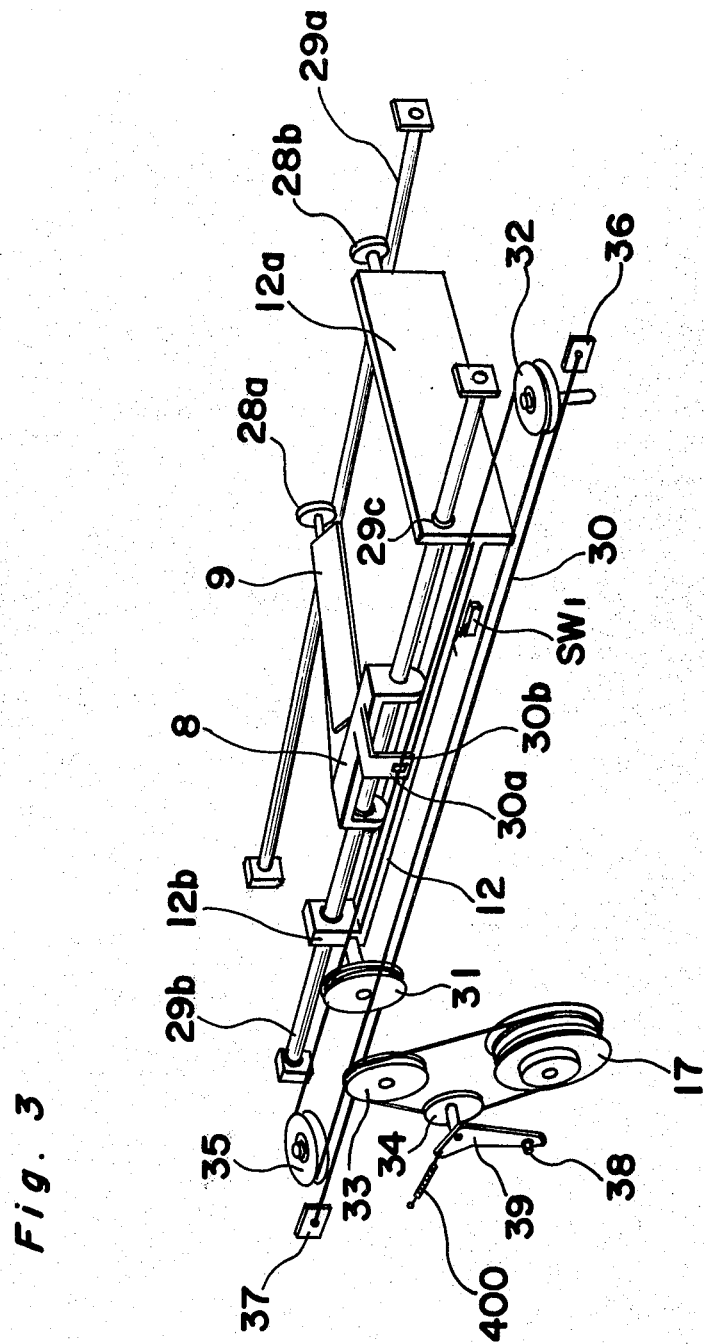
FIG. 3 is a perspective view showing the optical system incorporated in the electrophotographic copying machine shown in FIG. 2 according to the present invention.

Referring now to FIG. 3, there is shown a driving mechanism of the first holder 8 and the second holder 12. The first holder 8 carrying the first reflective mirror 9 is slidably supported at both lateral ends thereof by respective guide shafts 29a and 29b. More specifically, the first holder 8 is provided with a roller 28a capable of rolling on the guide shaft 29a at one lateral end thereof, while the other lateral end having a specific construction is slidably coupled to the guide shaft 29b. Each of the guide shafts 29a and 29b are secured to the frame of the copying machine at the longitudinal ends thereof. The second holder 12 carrying the second and the third reflective mirrors (not shown here) is also slidably supported by the respective guide shafts 29a and 29b. The second holder 12 is integrally constituted by a lateral board member 12a and a stripe member 12b, which is integrated to the lateral board member at one end thereof. The other end of the stripe member 12b is longitudinally extended along under the guide shaft 29b, with its forward end being integrally folded upwardly, thereby to make a slidably engageable portion with the guide shaft 29b. The lateral board member 12a is provided with a roller 28b at the lateral end thereof, while the upper portion thereof is provided with an aperture 29c, by which the second holder is slidably mounted on the guide shaft 29b. Furthermore, there is provided a drive pulley 31 on the stripe member 12b, by which the drive required for the scanning and the reverse movements of the respective holders 8 and 12 is transmitted. Notation SW1 designates a limit switch, which is located under the path of the first holder 8 so that it can be alternately actuated in accordance with forward and reverse movements of the first holder 8, the details of which are described hereinafter.

A cable 30 has its opposite ends rigidly secured to frame portions 36 and 37, respectively, while a substantially intermediate portion of the cable 30 extends around one of the pulleys 31 and then around other pulleys 32 and 33 both secured to the frame and a tension pulley 34. After being engaged by the tension pulley 34, the substantially intermediate portion of the cable 30 further extends around a drive transmission pulley 17 and then further around the pulley 33, a pulley 35 secured to the frame of the copying machine and the pulley 31 described above. The cable 30 after again extending around the pulley 31 is secured to the board 37. The drive transmission pulley 17 is rotatably driven by the electrical driving motor 15 in such manner as described below. Furthermore, the cable 30 has intermediate ends 30a and 30b rigidly secured to a portion of the first holder 8, the intermediate opposite ends 30a and 30b are provided for the cable 30 on its portion extending between the pulleys 31 and 32. The tension pulley 34 is secured to the base portion of an L-shaped lever member 39. The one end of the L-shaped lever member 39 is provided with an axle 38, by which the L-shaped lever member 39 is rotatably journalled to the frame of the copying machine, while the other end is secured to one end of a tension spring 400. By this arrangement, the cable 30 is kept tightly stretched through the spring force of the tension spring 400.

Figure 4:
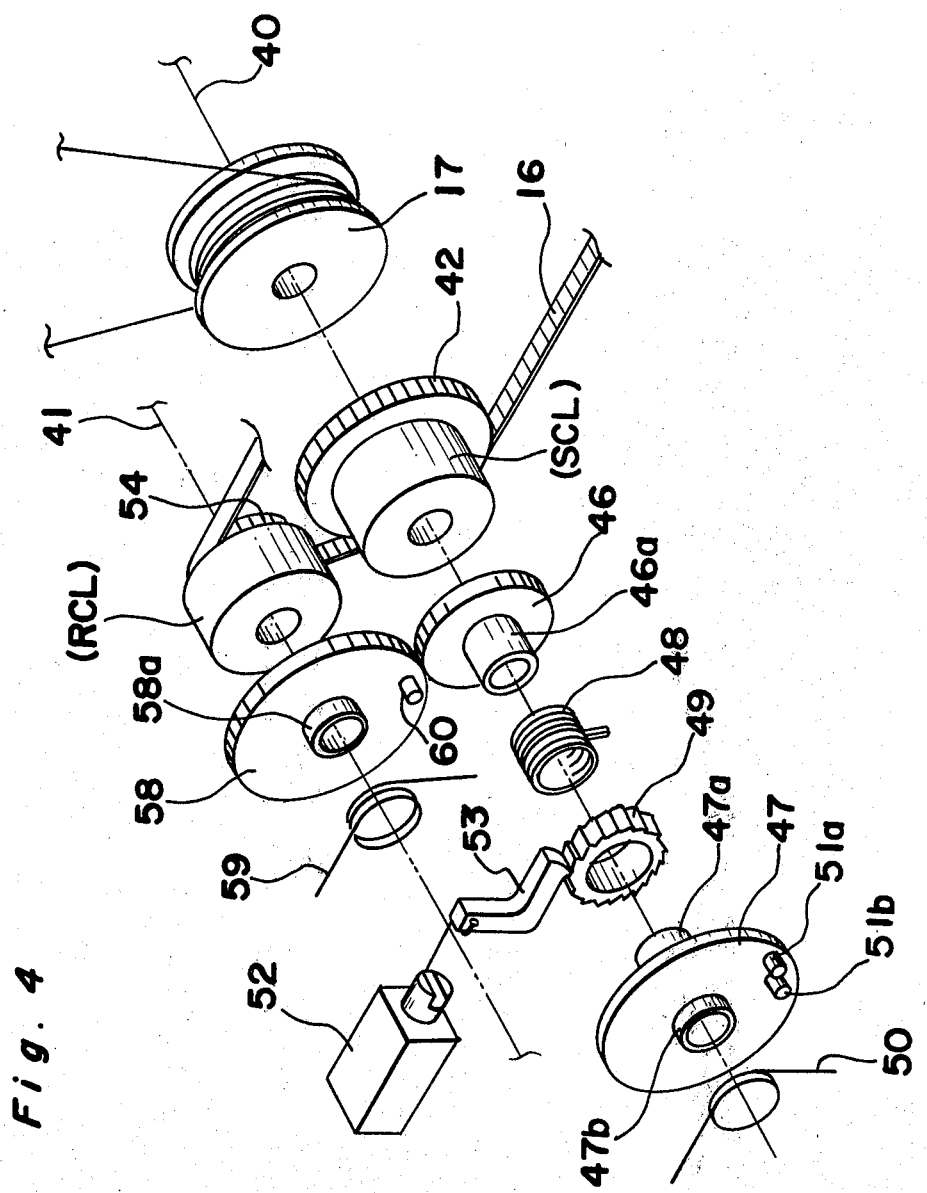
FIG. 4 is a perspective, disassembled view showing a pair of drive transmitting means for forward and reverse movements of the optical system shown in FIG. 3, each of which includes a clutching means and a resilient arrangement according to the present invention.
Figure 5:
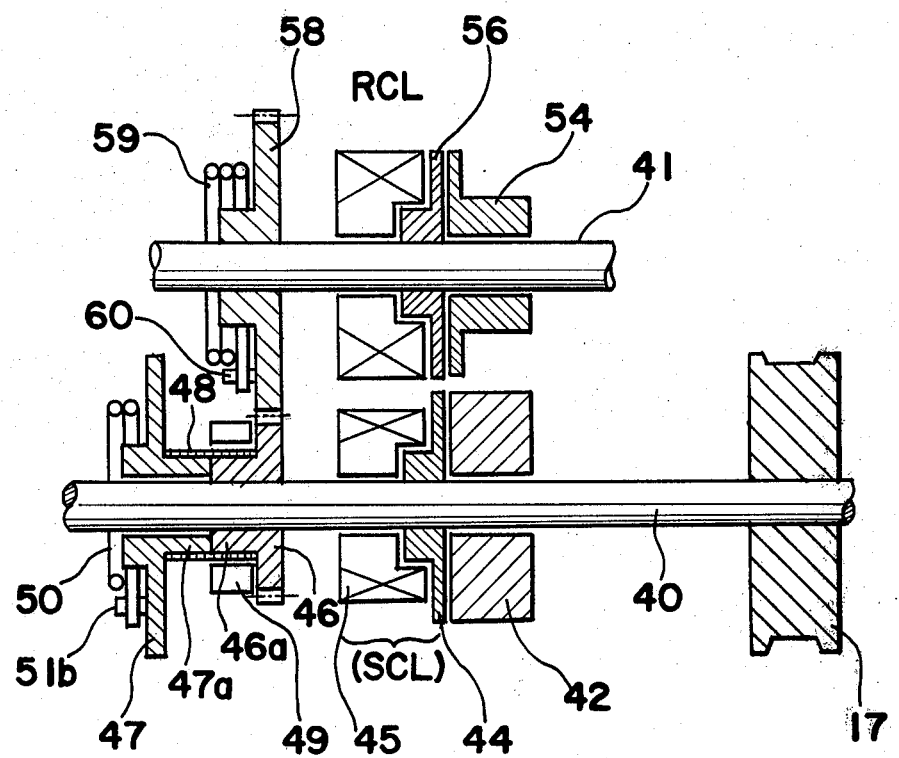
FIG. 5 is a cross-section of the assembly of the pair of the drive transmitting means shown in FIG. 4.

Referring now to FIGS. 4 and 5, there are shown drive interrupting means (a clutching system) in conjunction with resilient means (more specifically, a spring system for the scanning and the reverse movements). The drive transmission pulley 17 is mounted on a shaft 40, on which a scan pulley 42, a scan clutch (SCL), a scan gear 46, and a return spring operating board 47 are further mounted. Among these scan members, the drive transmission pulley 17, a clutch board 44 (see FIG. 5) included in the scan clutch (SCL), and the scan gear 46 are fixedly mounted on the shaft 40, while the other members described above are rotatably journalled on the shaft 40. In FIG. 5, numeral number 45 designates a coil member included in the scan clutch (SCL). In addition to these members, there is further provided a spring member 48 of the kick-up type around the shaft 40, it also being wound around respective boss portions 46a and 47a of the scan gear 46 and the return spring operating board 47. Moreover, a ratchet 49 is loosely engageably mounted on the portion of the spring member 48 which corresponds to the boss portion 46a. The return spring operating board 47 is provided with a pair of lugs 51a and 51b and a boss portion 47b on a surface on the opposite side from that provided with the boss portion 47a. Furthermore, there is further provided a return spring 50 coupled to the boss portion 47b, with one leg portion abutting against the lug 51a, while the other leg portion is secured to the frame portion of the copying machine. A pawl 53 is engageable with the ratchet 49, and is engaged with the ratchet 49 in accordance with the energization of solenoid 52.

As can be seen from FIGS. 4 and 5, there is provided another shaft 41, which rotates in association with the rotation of the shaft 40. The shaft 41 is so arranged that its longitudinal axis is parallelly spaced with respect to the shaft 40. Respective return pulley 54, a return clutch (RCL), and a return gear 58 are mounted on the shaft 41. Among these members, a return clutch board 56 included in the return clutch (RCL), and the return gear 58 are fixedly mounted on the shaft 41, while the other members are rotatably mounted on the shaft 41.

Figure 1:
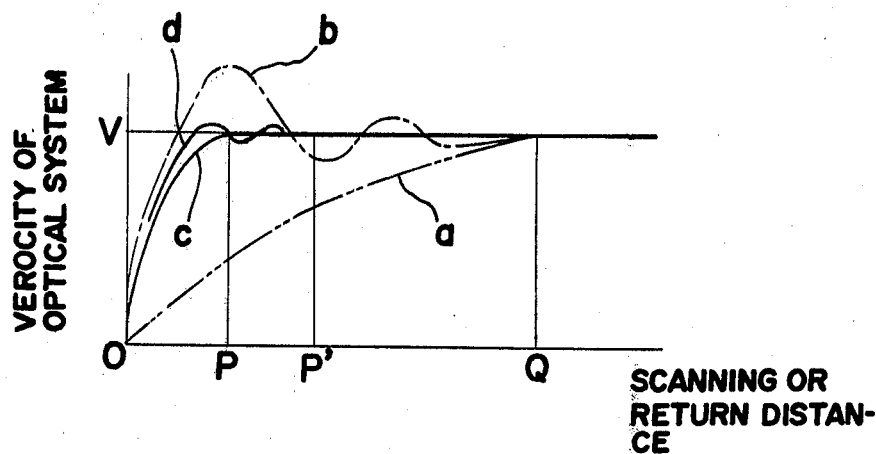
FIG. 1 is a graph showing the correlation between the increase of the velocities of several embodiments of an optical system including a conventional system with respect to the scanning distance prior to the attainment of the steady operating velocity of the optical system.

The endless belt 16 extends around the respective return pulley 54 and the scan pulley 42 in a manner such that these are rotated in the same direction when the endless belt 16 is driven by the driving motor 15 (see FIG. 1). Both the scan gear 46 and the return gear 58 are relatively mounted on the respective shafts 40 and 41 such that they mesh with respect to each other. The return gear 58 is provided with a boss portion 58a and a lug 60 on the surface thereof. Furthermore, there is provided a scan spring 59 positioned in a manner such that it is coupled to the boss portion 58a, with one leg portion being capable of abutting the lug 60, while the other leg portion is secured to the frame of the copying machine. However, it is to be noted here that the abutting engagement between the leg portion of the scan spring 59 and the lug 60 is arranged to be effected at a moment whereat the returning movement of the optical system is almost executed. By the abutting engagement, resilient energy is being stored by the scan spring 59.

Figure 6:
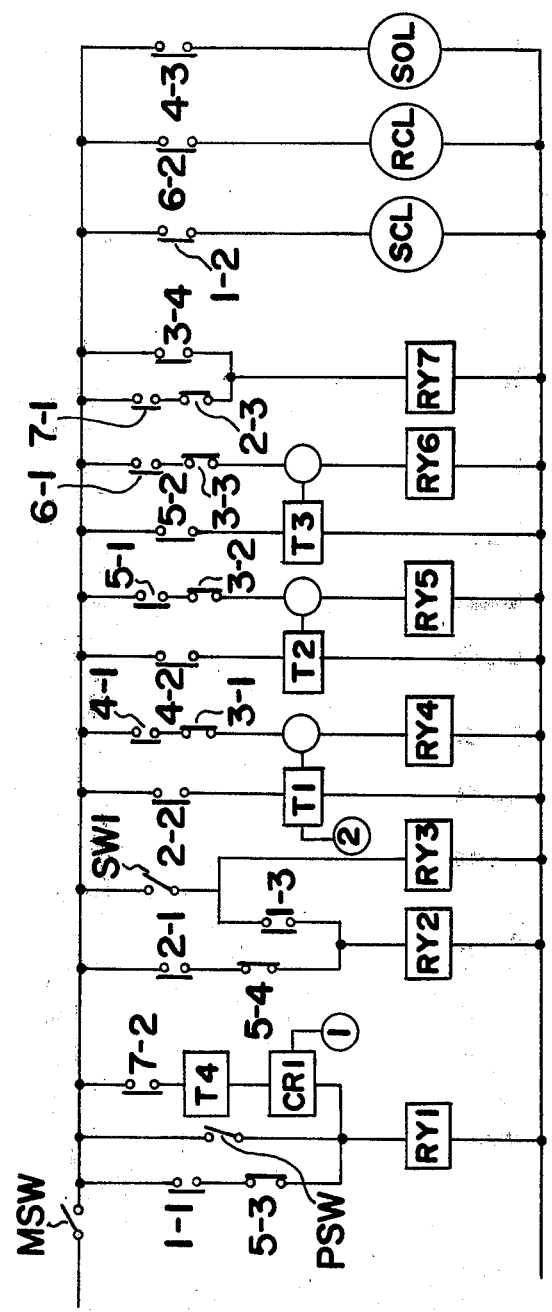
FIG. 6 is a block diagram showing the sequential actuations of members constituting the drive transmitting means shown in FIG. 4 according to the present invention.
Figure 7:
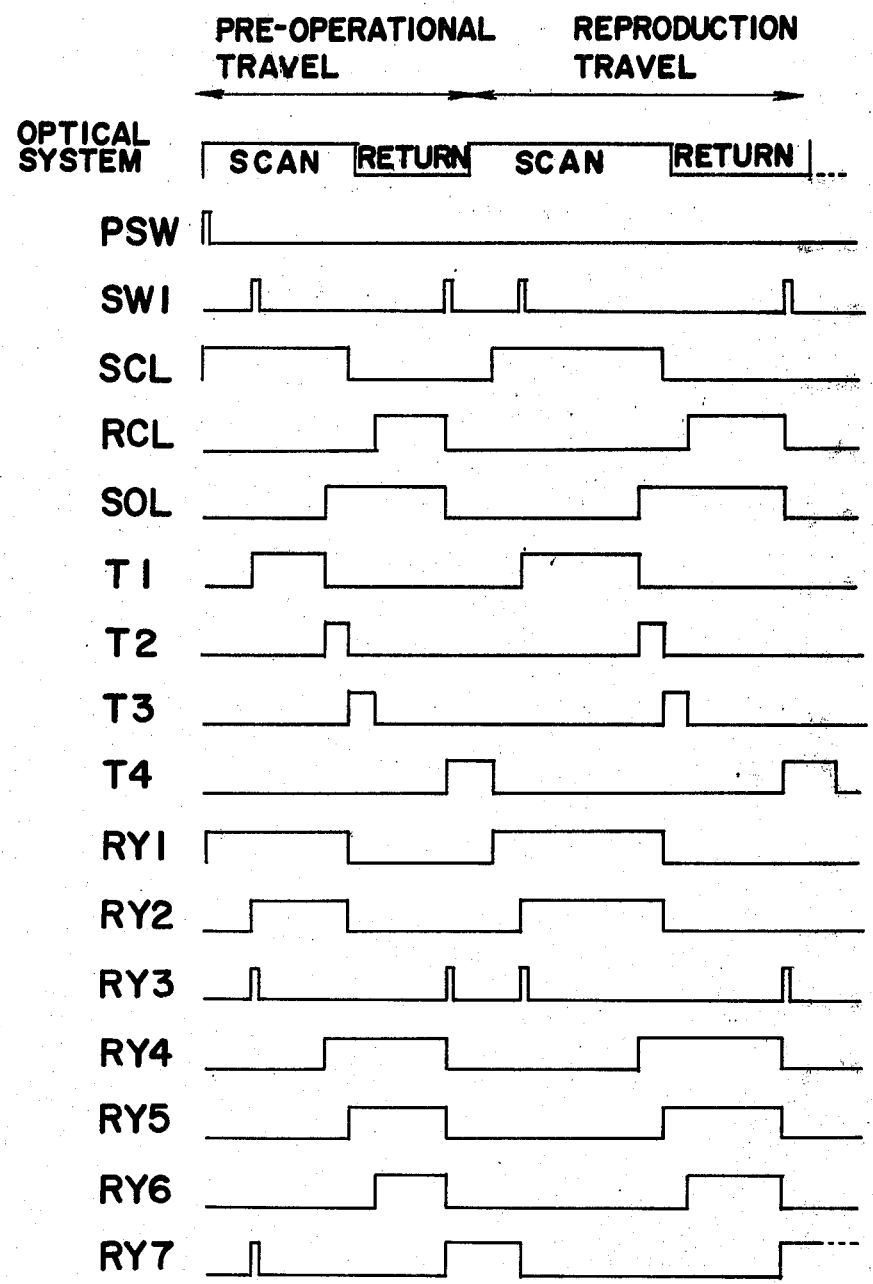
FIG. 7 is a time-chart particularly showing the sequential actuations to be effected in the electric circuit shown in FIG. 6.

In the following, the drive of the scan members, i.e. the optical system of the electrophotographic copying apparatus which is capable of reciprocating in the forward and the reverse directions as described hereinabove, is described in further detail with reference to FIGS. 6 and 7. When the optical system starts operation, a main switch (MSW) of the copying machine and the switching means (PSW) on the switching panel are first put on, respectively. Upon the actuation of the respective main switch (MSW) and switching means (PSW) as described above, a relay (RY1) is turned ON and a switching contact (1-1) is also turned ON. Accordingly, the self-retaining coil of the relay (RY1) is energized and then the scan clutch (SCL) is turned ON, after a switching contact (1-2) is turned to ON. Upon actuation of the switching contact (1-2), since the scan clutch (SCL) is ON, the scan pulley 42 is electromagnetically attracted by the clutch board 44 through the energization of the scan coil 45. Consequently, the drive transmitted through the belt transmission is further transmitted to the shaft 40 through the function of the scan clutch (SCL) as described above, and thus, the drive transmission pulley 17 fixedly mounted on the shaft 40 is rotated clockwise in FIG. 4, accordingly. In accordance with the clockwise rotation of the drive transmission pulley 17, the optical system (the first support 8 and the second support 12) are scanned towards the left in FIG. 2. However, this scanning operation is not accompanied by the light exposure. In addition to the actuation of the switching contact (1-2), the switching contact (1-3) is also turned ON. Such being the case, when the first support 8 is moved towards the left, switching means SW1 is turned on during the forward movement of the first support 8. Upon actuation of the switching means SW1, an ON actuation of a relay RY2 and the successive actuation of a switching contact (2-1) are effected. Thus, the relay RY2 is self-retained, after the switching contact (2-1) is closed.

On the other hand, soon after the switching means SW1 is turned ON, a relay RY3 is instantaneously turned ON, with the switching contact (3-4) being turned ON. However, with respect to the actuation of a relay RY7, since the switching contact (2-3) of the relay RY2 has been left OFF, the relay RY7 cannot be turned ON.

Furthermore, since the switching contact (2-2) has been turned ON, a timer T1 is started in operation. However, this timer T1 is arranged to be in the energized state while the full scanning of the optical system takes place. Soon after the timer T1 completes operating, a relay RY4 is turned ON. Successively, the relay RY4 is self-retained, after a switching contact (4-1) is turned ON. On the other hand, after the relay RY4 is turned ON, a switching contact (4-3) is also turned ON. Accordingly, the solenoid 52 is first turned ON and then, the pawl 53 is successively actuated to engage with the ratchet 49. Such being the case, the spring member 48 of the kick-up type is caused to function in association with the rotation of the shaft 40, so that the return spring operating board 47 per se is rotated clockwise. Thus, according to the present invention, by to the clockwise rotation of the return spring operating board 47 as described above, the return spring 50a is able to store the resilient energy.

Upon turning on the relay RY4, since a switching contact (4-2) is also turned ON, a timer T2 also starts in operation. Similarly, soon after the timer T2 completes the timing, a relay RY5 is turned ON and then the relay RY5 is self-retained by a switching contact (5-1) being turned ON. However, soon after the relay RY5 is self-retained, a switching contact (5-3) is turned OFF, and then, the relay RY1 is turned OFF. As a result, in association with the OFF actuation of the relay RY1, since the switching contact (1-2) is also turned OFF, the scan clutch (SCL) is turned OFF. Now, the optical system is prevented from the further movement, accordingly. However, such being the case, the shaft 40 is rotated counterclockwise by the resilient force stored by the return spring 50, which is transmitted through the return spring operating board 47, the spring member 48 of the kick-up type, and the scan gear 46.

Since the relay RY5 has been self-retained, not only the switching contact (5-4), but also the relay RY2 are turned OFF. Such being the case, not only is the timer T1 reset, but also a switching contact (5-2) is turned ON, with the result that a timer T3 is started. Since the timer T3 is arranged operate during the return movement of the optical system according to the present invention, the following sequential actuations are effected in accordance with the operation of the timer T3. Namely, at the end of the time of operation of the timer T3, a relay RY6 is first turned ON and then is self-retained through an ON actuation of a switching contact (6-1). Successively, a switching contact (6-2) is turned ON and then the return clutch (RCL) is turned ON. Thereby the shaft 40 is driven in rotation through the drive transmitted by the belt 16 when the return clutch (RCL) is turned ON. More specifically, the shaft 41 is driven in rotation by the belt 16 when the return clutch (RCL) is turned ON. The rotational drive thus transmitted to the shaft 41 is further transmitted to the scan gear 46 through the return gear 58 and then is further transmitted to the shaft 40, accordingly. In accordance with the belt drive transmission as described above, the shaft 40 together with the drive transmission pulley 17 are rotated counterclockwise. However, since the drive transmission pulley 17 has already been rotated counterclockwise with a certain velocity, e.g. an approximate value of 70% of a predetermined velocity with the help of the return spring 50, the drive transmission pulley 17 can continue the returning movement in a smooth manner, accordingly.

During the returning movement of the first support 8, the switching means SW1 is turned ON, and the relay RY3 is instantaneously turned ON. When the relay RY7 is turned ON, the relay RY7 is self-retained through the ON actuation of the switching contact (7-1). Furthermore, upon ON actuation of the relay RY7, a timer T4 is placed in operation through an ON actuation of a switching contact (7-2). On the contrary, upon ON actuation of the relay RY3, since respective switching contacts (3-1), (3-2), and (3-3) are turned OFF, the relays (RY4), (RY5), and (RY6) are respectively turned OFF. Accordingly, the switching contacts (4-3) and (6-2) are turned OFF, and consequently, the solenoid (SOL) and the return clutch (RCL) are respectively turned OFF. Such being the case, after the respective solenoid (SOL) and return clutch (RCL) are turned OFF, the optical system is moved to an end position of the return movement, i.e. a start position of the scanning movement, through the inertia thereof and then is stopped in cooperation with a buffer member (not shown) disposed at the start position of the scanning movement.

Soon after the optical system is returned to the end position of the return movement as described in the foregoing, the optical system starts scanning through the resilient energy stored in the scan spring 59, which has been stored when the optical system has almost completed the return movement. Furthermore, according to the present invention, the ON actuation of the scan clutch (SCL) is arranged to be effected as follows. When the optical system starting the free scanning movement as described above reaches a predetermined velocity (e.g. approximately 70% of the scanning velocity), a timer T4 is actuated so that the relay RY1 is turned ON through a breaking circuit CR1. By the sequential actuations as described earlier, the scan clutch (SCL) is again turned ON, and then, the optical system starts scanning with the help of the driving motor 15, thereby to effect the successive electrophotographic copying runs. However, according to the present invention, the breaking circuit CR1 is further so arranged that the scan clutch (SCL) is not scanned even after the operation of the timer T4, when the run number of the reproduction is more than that as indicated by a signal ①, which is imparted from a counter of the reproduction run number (not shown) and is input into the breaking circuit CR1 in a known manner. By the arrangement as described hereinabove, as long as the predetermined number of the reproduction runs is made, the breaking circuit CR1 is not turned ON, even if the timer R4 is actuated. Therefore, under such situation as described above, the optical system will not scan any more. As a result, when the predetermined number of the reproduction runs is made, the optical system starts scanning due to the resilient force, due to the fact that the resilient energy has been stored in the scan spring 59 in the manner as described earlier. However, in spite of the free scanning movement of the optical system, since the scan clutch (SCL) is not turned ON, the optical system is prevented from further movement thereof, and the resilient force stored by the scan spring 59 is, however, completely released. Therefore, according to the present invention, it is not necessary to provide a means which can hold the resilient force which has been stored in the scan spring 59. Furthermore, although the optical system is stopped in its forward movement or scanning movement at a position slightly forward of the start position, there will not be encountered any inconvenience at all owing to the fact that the initial, forward movement of the optical system is not accompanied by a light exposure operation as described earlier.

In addition, with respect to the timer T1, a signal carrying information indicative either of an original size or a magnifying mode ② is capable of being input thereto, so that the period of the timer T1 can be regulated. By this arrangement, the resilient force of the return spring member 50 can be maintained constant, irrespective of the size of the original or the like. Moreover, according to the present invention, the length of the initial, forward movement of the optical system can be a length corresponding to the size of the original. Furthermore, the initial, forward movement of the optical system can be completely eliminated, by a signal indicative of a certain reference scale determined in advance being input to the timer T1. In brief, according to the present invention, the optical system does not travel a full scanning distance if the length of the original is smaller than the full scanning distance. Due to the advantage described above, rapid, continuous electrophotographic reproduction can be accomplished quite effectively. Such advantages as described above are effected, if the period of the timer T1 is appropriately adjusted in advance. More specifically, by way of example, according to one preferred embodiment, the period of the timer T1 can be adjusted by including a step to detect the length of the copying paper stored in the cassette 19 for the control of the present invention.

According to the embodiment as described above, the return clutch (RCL) and the scan clutch (SCL) are respectively turned ON, when the respective free forward and the reverse movements of the optical system reach a velocity which corresponds to approximately 70% of the respective predetermined operating velocities. However, the values of 70% of the respective predetermined operating velocities are not critical, and it is possible to choose any relative ratios, as long as the relative ratios lie in the range 0 to 100%. Such being the case, both of the return clutch (RCL) and the scan clutch (SCL) are adapted to be turned ON, respectively, when the conversion from the scanning movement to the returning movement, and the reverse are effected. Alternatively, both the return clutch (RCL) and the scan clutch (SCL) are adapted to be turned ON, when the respective scanning and the returning movements reach the respective the predetermined operating velocities.

According to the embodiment as described above, the rotation of the return gear 58, which is caused by the resilient force stored in the scan spring 59, is arranged to be more or less one rotation around the shaft 41, even when a full lengthwise scanning is required. As will be clear from the description in the foregoing, the rotational stroke of the lug 60 per se is subjected to the operational mode i.e. the predetermined selection of the scanning or the reverse distance. However, according to the present invention, irrespective of the predetermined selection of the scanning or the reverse distance, the relative positioning of the lug 60 is arranged to be substantially the same in a known manner, whenever the optical system arrives at the end position of the return movement. This corresponds to the fact that the resilient energy stored by the scan spring 59 subject to the rotation of the return gear 58 is always maintained constant.

As is clear from the description of one preferred embodiment of the present invention, the optical system is first moved forwardly prior to the initial start of the scanning movement accompanied by the light exposure. In addition, the optical system is actuated to have an initial velocity by the resilient force of the resilient member subsequent to the alternate arrivals at the respective end positions of the forward and reverse movements. Furthermore, after having obtained the predetermined velocity either for the scanning operation or the return operation, the optical system is driven by the clutch means. Accordingly, as specifically shown in a curve (c) in FIG. 1, the increase in velocity of the optical system to the predetermined operating velocity is quite large, and the optical system of the present invention attains the predetermined operating velocity at a point denoted by P. As described earlier, since the resilient means for use in the resilient drive of the shaft is mounted on the shaft per se, the resilient energy which has been stored therein can be effectively transmitted to the shaft and thus the optical system can be continuously actuated until it reaches the predetermined velocity. Moreover, since the resilient force is arranged to be gradually released according to the present embodiment, there is no danger that the optical system and the other elements included in the copying machine will be damaged by the abrupt vibration and the like, which are otherwise effected by the resilient force produced by similar arrangements. More specifically, the return spring member 50 is associated with the shaft 40, on which the scan clutch (SCL) is mounted, while the scan spring 59 is associated with the shaft 41, on which the return clutch (RCL) is mounted.

Figure 8:
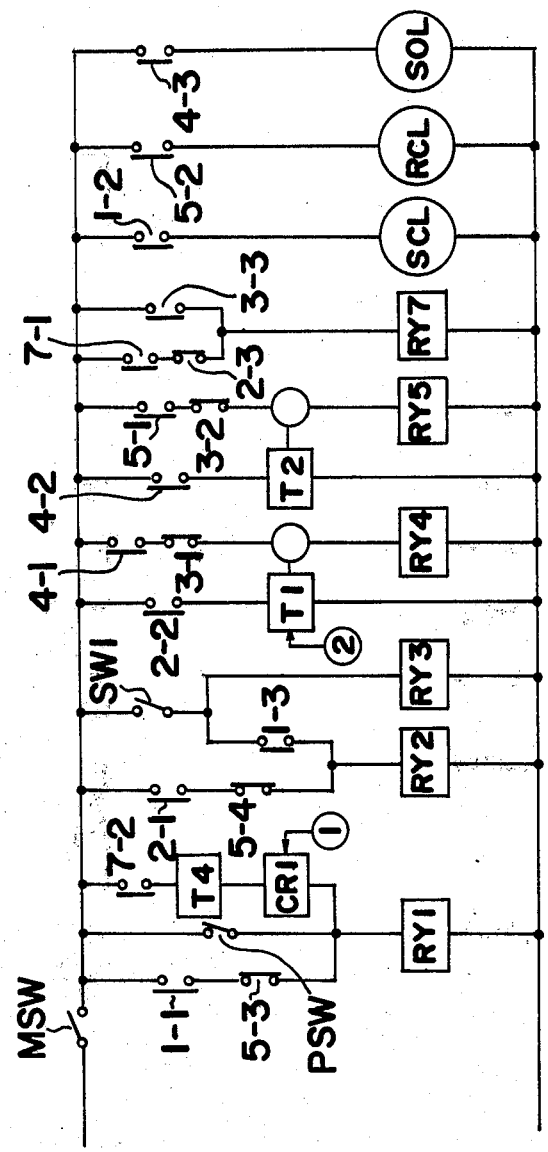
FIG. 8 is a block diagram showing in the sequential actuations of members constituting another embodiment of the drive transmitting means according to the present invention.

Referring now to FIG. 8, there is shown another modified embodiment of the present invention. In this embodiment, as compared with the former embodiment shown in FIG. 6, the timer T3 and the relay RY6 including associated switching contacts are omitted. Thus, the return clutch (RCL) of this embodiment is actuated by the switching contact (5-2).

According to the former embodiment, the return clutch (RCL) is turned ON through the actuation of the timer T3, while the timer T3 itself is started by the actuation of the timer T2. Therefore, the optical system is arranged to be driven with the driven motor 15 for the return movement, after the optical system reaches the predetermined certain velocity. However, according to the latter embodiment, upon actuation of the timer T2, not only is the scan clutch (SCL) OFF, but also the return clutch (RCL) is turned ON. Thus, the optical system is capable of being returned by the resilient force of the return spring member 50 in conjunction with the driving force from the driving motor 15.

The other functional characteristics are the same as those of the former embodiment.

According to the latter embodiment as described above, the rate of increase of the velocity of the optical system is a little smaller than that produced by the former embodiment, which situation is shown by the curve (d) in FIG. 1. However, when compared with the rate of increase provided by the conventional arrangements, the rate of increase in the present arrangement is still large and, the predetermined velocity of the steady operating velocity can be obtained at a distance denoted by P'.

In the foregoing description, the means for driving reciprocating members for use in the electrophotographic copying machine of the scanning exposure type is particularly detailed in connection with the copying machine of the optical system transfer type. However, the present invention described above is, of course, applicable to an electrophotographic copying machine of the manuscript platform transfer type. In addition, the resilient members are not necessarily provided for both of the shafts 40 and 41, respectively. More specifically, when the resilient force is used only for the conversion from the scanning movement to the returning movement, it is not necessary to provide the resilient member for the shaft 41.

According to the present invention, there is provided an improvement of the means for driving reciprocating members of the scanning type, in which the scanning member is arranged to be driven by the driving means either at the instance when the scanning member is actuated through the resilient force of the resilient member or when the scanning member subsequently reaches a predetermined velocity. By the arrangement described above, it is possible to make the scanning member have the rapid increase in the velocity to the steady operating velocity with the result of rapid movement of the scanning member.

As for another advantage of the present invention, since the initial movement for the steady operation can be shortened, the consequent copying machine can be compact in size. Furthermore, since the driving means is mechanically connected to the scanning member after the scanning member has already reached the predetermined initial velocity, a driving means with the small load rating can be used for this purpose.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. Means for driving reciprocating members, which is for use in alternate drives for scanning and return movements of at least one movable member of an electrophotographic copying machine of the scanning exposure type, thereby to cause an original to be scanned, comprising:

clutching means to selectively transmit and interrupt alternate drives, thereby to cause said movable member to be electrically driven for said scanning and return movements, said clutching means including a first clutch member mounted on a first shaft for said return movement and a second clutch member mounted on a second shaft for said scanning movement;

a return gear mounted on said first shaft and a scan gear mounted on said second shaft, both being meshed with each other;

resilient means for causing said movable member to have a predetermined initial velocity for said return movement subsequent to arrival at an end position of scanning through the resilient energy stored thereby, said resilient means being substantially mounted on said second shaft so that it can function in association with the rotation of said second shaft; and electric circuit means for sequentially controlling said scanning and return movements of said movable member therewith;

wherein an actuation for said return movement of said movable member is adjustable to correspond to a lengthwise dimension of said original with said clutching means in cooperation with said electric circuit means.

2. Means for driving reciprocating members as claimed in claim 1, wherein said control circuit means comprises a limit switch, which is disposed on a track of said movements of said movable member so that it can be actuated by said movable member; a plurality of relay members; a plurality of switching contacts functioning in association with each of said relay members; a plurality of timers including a first and second timer, said first timer being turned ON in accordance with an actuation of said limit switch during said scanning movement, said second timer being turned ON, upon actuation of said first timer; and a solenoid member including a member capable of seizing said resilient means when energized, said solenoid member being energized upon said actuation of said first timer; said second clutching member being turned OFF upon said actuation of said second timer, whereby said resilient means can store said resilient energy prior to the end of said scanning movement.

3. Means for driving reciprocating members as claimed in claim 2, wherein said control circuit means further includes a third and a fourth timer, said first clutch member being turned ON, upon actuation of said third timer, with said third timer being turned ON, upon said actuation of said second timer, both of said first clutch member and an energization of said solenoid member being turned OFF in association with an actuation of said limit switch by said movable member during said return movement of said movable member, said fourth timer, which is turned ON through said actuation of said limit switch during said return movement, being capable of effecting an ON actuation of said second clutch member, soon after said fourth timer is actuated.

4. Means for driving reciprocating members as claimed in claim 3, wherein said control circuit means further includes a breaking circuit for preventing said second clutch member from being turned ON even after said actuation of said fourth timer, when run number of the reproduction is more than that as indicated by a signal, which is applied from a counter of the reproduction run number so as to be input into said breaking circuit.

5. Means for driving reciprocating members as claimed in claim 2, wherein said seizing member included in said solenoid member is a pawl, said resilient means comprising a return spring operating member which is journalled on said second shaft and is provided with at least one lug; a spring member of the kick-up type which is wound around respective boss portions of said scan gear and said return spring operating member; a ratchet which is engageably mounted on a portion of said spring member, with said portion corresponding to said boss portion of said scan gear; and a return spring which is coupled to another boss portion of said return spring operating member, with one leg portion abutting said lug in a manner such that said return spring can store said resilient energy subject to a rotation of said return spring operating member towards said scanning movement, wherein upon energization of said solenoid member, said pawl is actuated to engage with said ratchet, with said spring member being actuated to function in association with said rotation of said second shaft so that said return spring operating member is rotated towards said scanning movement.

6. Means for driving reciprocating members as claimed in claim 1, further including another resilient means for causing said movable member to have an initial velocity for said scanning movement subsequent to arrival at an end position of return through the resilient energy stored thereby, said another resilient means is substantially mounted on said first shaft so that it can function in association with the rotation of said first shaft.

7. In an electrophotographic copying machine of the scanning exposure type which includes a reciprocatingly movable scanning means for successively projecting an image of original onto a rotatable photoreceptor member, a corona charging means for uniformly charging the surface of said photoreceptor member, an image transferring means for transferring an image formed on the photoreceptor member onto a copying paper and means for feeding the copying paper along a predetermined path through said image transferring means, a driving means for said scanning means which comprises:

clutching means for driving said scanning means for forward and return movements and including a first clutch member mounted on a first shaft for said return movement and a second clutch member mounted on a second shaft for said forward movement;

resilient means for causing said scanning means to have a predetermined initial velocity for said return movement subsequent to termination of said forward movement through the resilient energy stored thereby, said resilient means being mounted on said second shaft; and means for terminating the forward movement of said scanning means without scanning the full distance for a shorter length original.

8. An electrophotographic copying machine as claimed in claim 7 further including a second resilient means mounted on said first shaft for causing said scanning means to have a predetermined initial velocity for said forward movement subsequent to termination of said return movement through the resilient energy stored thereby.

* * * * *